United States Patent [19]
Leedom

[11] 3,954,272
[45] May 4, 1976

[54] SIGNAL PICKUP RETURN MECHANISM

[75] Inventor: Marvin Allan Leedom, Princeton, N.J.

[73] Assignee: RCA Corporation, New York, N.Y.

[22] Filed: Mar. 10, 1975

[21] Appl. No.: 557,179

[52] U.S. Cl. .............................. 274/23 A; 360/105; 178/6.6 R; 178/6.6 A
[51] Int. Cl.² ......................................... G11B 3/10
[58] Field of Search ............. 274/9 B, 23 A; 360/75, 360/104, 105; 178/6.6 A, 6.6 R, 6.6 P

[56] References Cited
UNITED STATES PATENTS

| | | | |
|---|---|---|---|
| 2,508,845 | 5/1950 | Thompson | 274/9 B |
| 3,767,848 | 10/1973 | Schuller | 274/23 A |

Primary Examiner—Alfred H. Eddleman
Assistant Examiner—Alan Faber
Attorney, Agent, or Firm—Eugene M. Whitacre; William H. Meagher; Dilip A. Kulkarni

[57] ABSTRACT

In a system for playing back prerecorded information from a disc record by a signal pickup mounted in a support housing, a signal pickup return mechanism is provided. The support housing is reciprocably mounted in the player cover by a suitable bearing. A drive mechanism drives the support housing radially inward in order to facilitate tracking of the disc record by the signal pickup. An extendible cord is provided with its ends attached to the base and the cover of the player. The cord extends when the cover is raised from the base. A leaf spring, with an open-ended slot, is attached to the support housing. The cord is threaded through the open-ended slot. A clamp secured to the cord is subject to engagement with the support housing, and is effective only in causing radially outward movement of the support housing. The clamp urges the support housing to return to a rest position when the cover is raised from the base.

8 Claims, 4 Drawing Figures

SIGNAL PICKUP RETURN MECHANISM

This invention pertains to a signal pickup return mechanism suitable for use with a video disc system.

BACKGROUND OF THE INVENTION

In certain video disc systems, video information is recorded by means of geometric variations in the bottom of a smooth spiral groove on the surface of a disc record. The disc record surface includes a coating of conductive material which is preferably covered with a thin deposit of dielectirc material. A signal pickup subject to engagement with the spiral groove includes a conductive surface which cooperates with the conductive coating and the dielectric deposit of the disc record, to form a capacitor. When the disc record is rotated, an edge of the conductive surface of the signal pickup, while riding in the disc record groove, recovers capacitive variations due to geometric variations in the bottom of the smooth spiral groove. The capacitive variations representing prerecorded video information are processed and applied to a conventional television receiver for reproduction. The variable capacitor concept is described in detail in the U.S. Pat. No. 3,842,194, issued to J. K. Clemens, entitled "INFORMATION RRECORDS AND RECORDING/PLAYBACK SYSTEMS THEREFOR", and assigned to the present assignee.

The capacitive variations between the conductive coating of the disc record and the conductive surface of the signal pickup are a part of a tuned circuit, wherein the resonant frequency of the tuned circuit varies as the capacitance between the signal pickup and the disc record changes. A flexibly mounted conductive member (e.g., pickup arm) is provided, with its free end electrically and mechanically coupled to the conductive surface of the signal pickup, and the pivoted end movably connected to a hollow box-lixe support housing, also made of conductive material. The conductive member mechanically supports the signal pickup, and also forms a transmission line with the surrounding conductive support housing. The tuned circuit includes the reactance of the transmission line and the capacitance between the signal pickup and the disc record. The tuned circuit is energized by a fixed, high frequency (for example, 915 MHz) oscillator. The response of the tuned circuit to the oscillator excitation signal changes as a function of the prerecorded information on the disc record. The output signals from the tuned circuit, indicative of information prerecorded on the disc record, are subsequently applied to a suitable signal processing circuit coupled to a television receiver for image display. The transmission line concept is described in detail in the copending U.S. Pat. No. 3,872,265, issued to S. E. Hilliker, entitled "VIDEO DISC TRANSMISSION LINE AND STYLUS RF RETURN SYSTEMS", and assigned to the present assignee.

In order to prerecord a reasonable length of programs, video disc systems of the aforementioned type employ disc records having a relatively high groove density (e.g., 4,000 to 6,000 grooves per inch). The use of high groove densities results in fine groove dimensions. For example, the groove separation may be 3.5 microns and the groove depth may be 2.5 microns. It has been found that the fragile walls of the video disc record grooves cannot be dependably relied upon for tracking (that is, driving the signal pickup support housing during playback radially inward across the prerecorded surface of the disc record). Therefore, the support housing, carrying the signal pickup, is driven radially inward by a suitable drive mechanism in proper time relationship with the rotational speed of the disc record. The drive mechanism drives the signal pickup radially inward toward the center of rotation of the disc record such that the attitude of the signal pickup conductive surface is held relatively constant with respect to the groove.

In an above-mentioned type system, returning of the support housing after a playback cycle to a rest position (so that the playback sequence may be later repeated) becomes quite complicated, especially where the support housing rest position is above the starting groove in the disc record. The drive motor, employed for radially inward movement of the support housing, may be reversed at the end of a playback cycle causing the support housing to travel radially outward to the rest position. Such an arrangement may be undesirable. First, a motor with a reversible feature means additional cost. Second, the return of the support housing may take as much time as a real time playback (e.g., 15 to 20 minutes for a long-playing disc record), unless a rather expensive two-speed reversible drive motor is provided. That may mean that, between any two successive playbacks, the viewer would wait for a relatively long interval of time to allow the support housing to return to the rest position. An alternative may be employment of a separate high speed motor for a rapid return of the support housing to the rest position. The alternative of providing a separate high speed motor may be disadvantageous for reasons such as cost and complicated linkages connecting the separate motor to the drive mechanism. One of the objects of the present invention is to provide an improved signal pickup return mechanism which is simple and rugged in construction easy to install, inexpensive to manufacture, and yet efficient and reliable in operation.

It may be beneficial to locate the support housing, carrying the signal pickup, and the drive mechanism in the cover of the player. For example, an advantage may be that the pickup support housing need not clear the disc record between successive playback cycles in a manual player; because when the cover is lifted away from the base, the support housing and the drive mechanism would be automatically cleared out of the way. Another advantage may be that the 915 MHz transmission line in the Hilliker type playback system (U.S. Pat. No. 3,872,265) could be enclosed in the cover in order to provide an additional shielding for preventing deleterious effects on the surrounding electronic equipment. It is another object of the present invention to provide a signal pickup return mechanism that is compatible with an arrangement whereat the support housing and the drive mechanism are located in the cover of the player.

SUMMARY OF THE INVENTION

In a system for playing back prerecorded information from a disc record by a signal pickup mounted in a support housing, a signal pickup return mechanism is provided. The support housing is reciprocably mounted in the player by a suitable bearing. Drive means drives the support housing radially inward in order to facilitate tracking of the disc record by the signal pickup. Extendible cord means is provided having its ends secured to the base and the cover of the player. The cord means extend when the cover is lifted away from the base. Means are affixed to the cord means subject to engagement with the support housing. The engaging means is only effective in causing radially outward movement of the support housing. The engaging means permit without hindrance radially inward motion of the support housing when the cover remains secured to the base, while urging the support housing to return to a rest position as the cover is lifted away from the base.

BRIEF DESCRIPTION OF THE DRAWINGS

A better understanding of the present invention may be obtained from the following detailed description of a specific embodiment thereof when taken in conjunction with the accompanying drawings in which.

DETAILED DESCRIPTION OF THE PREFERRED EMBODIMENT

Figure 1:
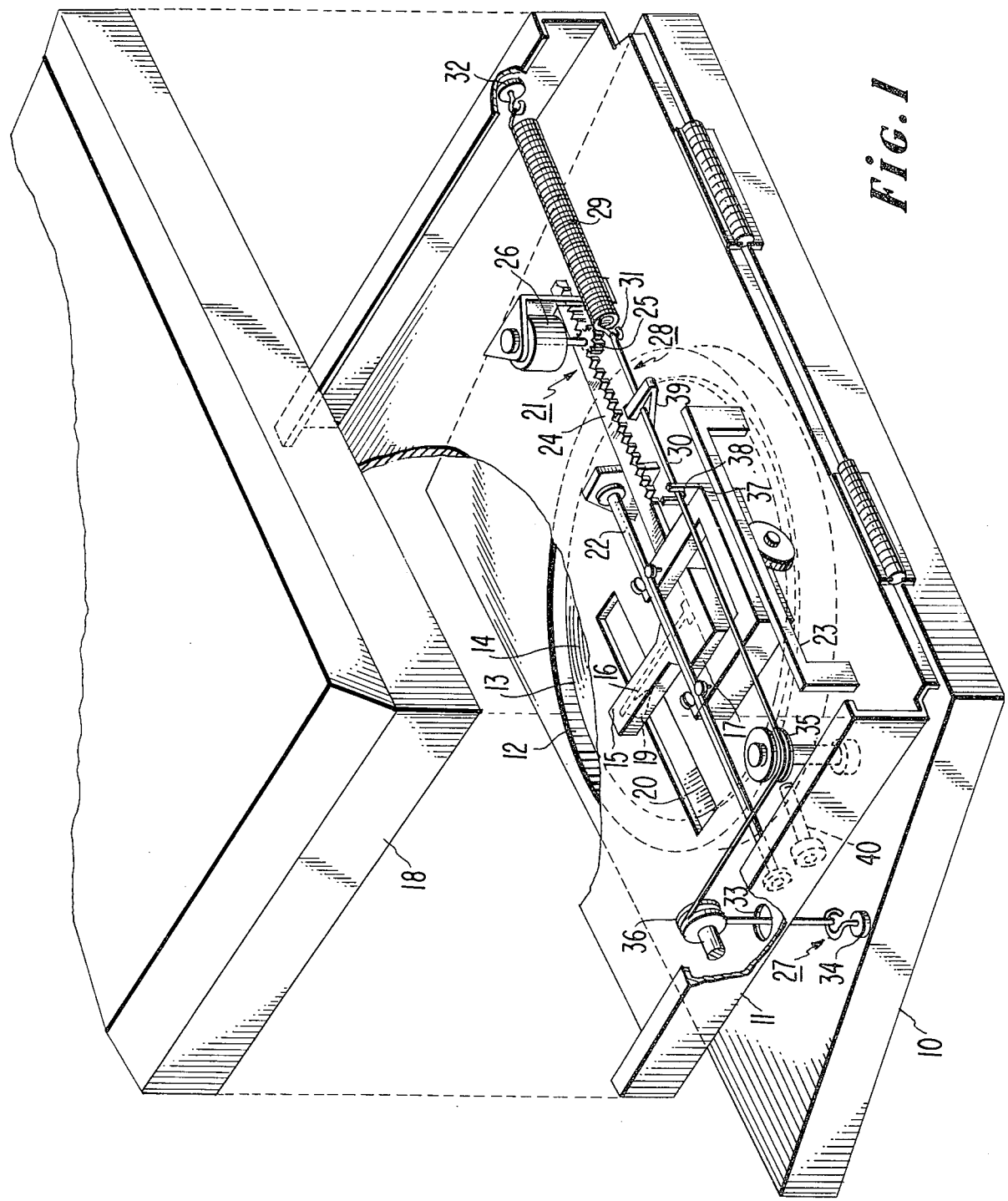
FIG. 1 is a partial perspective view of a playback system employing a signal pickup return mechanism pursuant to the principles of the present invention.

Referring to the drawings, wherein like reference numerals designate similar elements in the various views, in FIG. 1 a video disc playback apparatus is shown with a base 10 and a hinged cover 11. The apparatus is suitable for use in a video disc system such as disclosed in the aforementioned Clemens' patent (U.S. Pat. No. 3,842,194). A turntable 12 is rotatably mounted on the base 10. The surface of the turntable 12 is adapted to support a disc record 13. A motor and a suitable linkage mechanism (not shown) drives the turntable 12 at a predetermined speed when the player is operative. The rotational motion of the turntable 12 is transmitted to the disc record 13 via frictional contact between the turntable and the disc record. Video information is contained in geometric variations in the bottom of a smooth spiral groove 14 on the surfaces of the disc record 13. The disc record surface includes a coating of conductive material which is preferably covered with a thin deposit of dielectric material. A signal pickup 15, subject to positioning in the groove 14, includes a conductive surface which together with the conductive layer and the dielectric coating of the disc record form a capacitor. When a relative motion is established between the signal pickup 15 and the disc record 13, an edge of the conductive surface included in the signal pickup, while riding in the groove 14, recovers capacitive variations due to geometric variations in the bottom of the spiral groove. The capacitive variations, representative of prerecorded information on the disc record 13, are transmitted via a high frequency (e.g. 915 MHz) transmission line (such as taught in S. E. Hilliker's application, U.S. Pat. No. 3,872,265) to a suitable signal processing circuit. The signal pickup 15 is carried by the free end of a pickup arm 16. The pivoted end of the pickup arm 16 is movably connected to a hollow box-like support housing 17.

As indicated before, in order to effectively shield high frequency transmission line, including the conductive pickup arm 16 and the support housing 17, the support housing assembly is enclosed within a cover frame 11 and a cover lid 18 containing at least a thin layer of sheet metal or screening for preventing a deleterious interference with surrounding electronic equipment. Apertures 19 and 20 are provided in the bottom walls of, respectively, the support housing 17 and the cover frame 11 to permit the signal pickup 15 to engage the disc record groove 14 when the player is operative. It must be noted that although in this particular embodiment the support housing 17 is located in the cover 11 of the player, it may as well be mounted on the base 10 of the player for the purposes of practicing the present invention. An arrangement showing the support housing 17 mounted on the base 10 will be described later.

As described earlier, relatively fragile walls of video disc record grooves (for example, in a disc record having 4,000 to 6,000 grooves per inch) cannot be dependably relied upon for the radical tracking of the signal pickup 15 across the recorded surface of the disc record 13. Therefore, it is desirable to employ a drive mechanism 21 for providing the required radial tracking. Accordingly, bearing means 22 and 23 are affixed to the cover frame 11 which permit to-and-fro travel of the support housing 17. The bearing means 22 and 23 are so oriented that, when the cover 11 is secured onto the base 10, the plane of travel of the support housing 17 is substantially parallel to the turntable surface 12. One end of a rack 24 is connected to the support housing 17. The other end of the rack 24 engages a pinion 25. The pinion 25 is coupled to a transport mechanism drive motor 26 through an appropriate linkage. The motor 26 drives the support housing 17, carrying the signal pickup 15, radially inward in proper time relationship with the rotational speed of the disc record 13 during playback. Thus, the attitude of the conductive surface of the signal pickup 15 is held relatively constant in relation to the groove 14. As noted before, it is advantageous to maintain a relatively constant attitude of the signal pickup 15 in the groove 14 during playback for obtaining accurate reproduction of the prerecorded signals.

Figure 2:
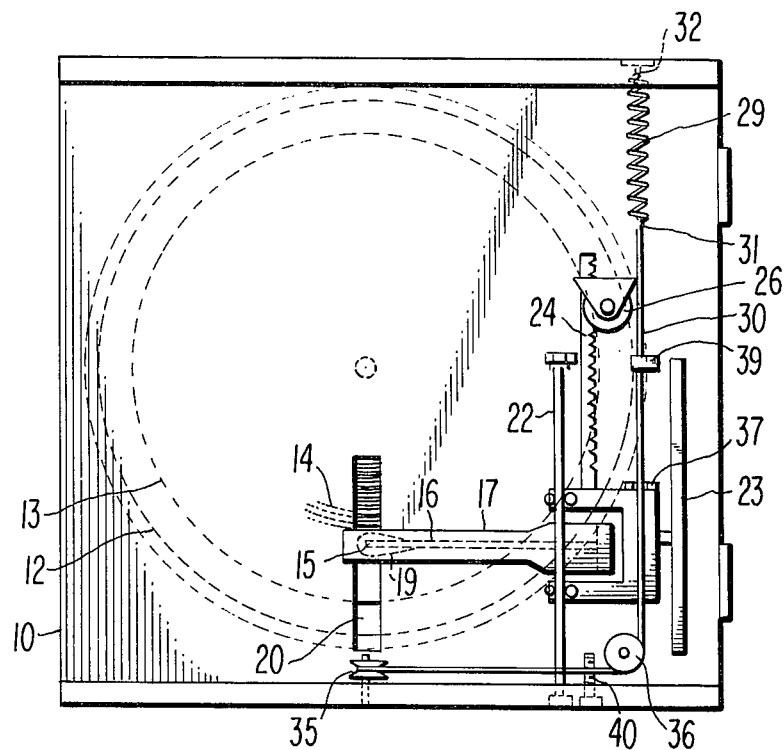
FIG. 2 is a simplified schematic plan view of the arrangement of FIG. 1.
Figure 3:
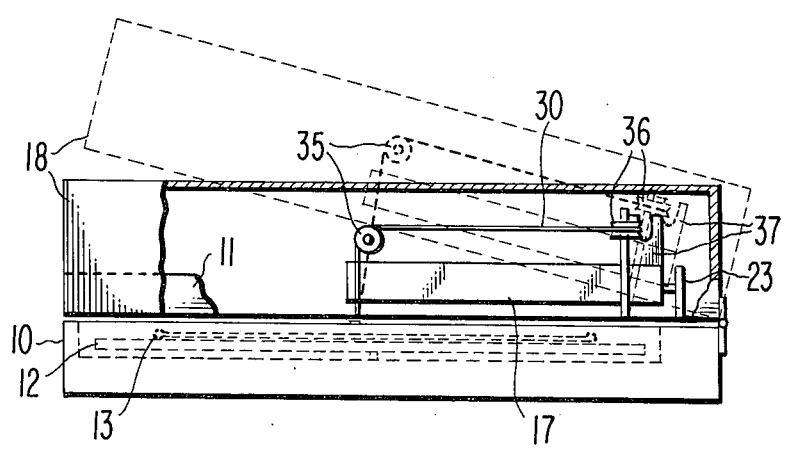
FIG. 3 is a simplified schematic end view of the arrangement of FIGS. 1 and 2.

A signal pickup return mechanism 27, acording to the present invention, for returning the support housing 17 carrying the signal pickup 15 at the end of a playback cycle to a rest position, will now be described with reference to FIGS. 2 and 3. FIGS. 2 and 3 are, respectively, the plan view and the end view of the video playback system of FIG. 1 employing the signal pickup return mechanism. An extendible cord means 28 has a first portion 29 and a second portion 30. The first portion 29 is stretchable, and in this particular embodiment the first portion is a spring. The second portion 30 is relatively inelastic and in this particular embodiment the second portion is a wire. The first ends of the first portion 29 and the second portion 30 are connected together by a joint 31. The second end of the spring 29 is connected to the cover frame 11 by a hook 32. The second end of the wire 30 is threaded through an aperture 33 in the bottom wall of the cover frame 11 and is connected to the base 10 by a hook 34. The wire 30 is supported by two pulleys 35 and 36 having mutually orthogonal axes as illustrated in FIG. 1. The pulleys 35 and 36 are rotatably mounted in the cover 11. A leaf spring 34 is affixed in cantilevered manner from the support housing 17. An open-ended slot 38 is provided in the leaf spring 37 to allow a free passage of the wire 30. A clamp 39 is affixed to the wire 30 between the leaf spring 37 and the spring 29. The cover frame 11 is hinged to the base 10 by a pair of hinges 41 and 42. It may be observed, particularly from FIGS. 1 and 3, that when the cover 11 is lifted away from the base 10, the second end of the wire 30 being fixed to the base by the hook 34, the first end of the wire pulls the spring 29 away from the support hook 32, causing an elongation of the spring. The clamp 39, affixed to the wire 30, moves outwardly (in a direction away from the center of rotation of the turntable 12) with the wire.

The operation of the signal pickup return mechanism 27 will now be described. The chronology of the events is as follows: the cover 11 is lifted away from the base 10 and a selected disc record 13 is placed on the turntable 12. The cover 11 is closed onto the base 10 and the player is turned on. It is assumed that the support housing 17, carrying the signal pickup 15, is at the rest position. The rest position may be a position of the support housing 17 such that the signal pickup 15 is above the starting groove in the disc record 13. The turntable 12 and the disc record 13 begin rotating at the predetermined speed. The pickup arm 16 carrying the signal pickup 15 is lowered to allow the signal pickup 15 to pass through the apertures 19 and 20 in the bottom walls of, respectively, the support housing 17 and the cover frame 11 to engage the groove 14 of the disc record 13. The drive mechanism 21 is activated and the motor 26 drives the support housing 17, through the pinion 25 engaged with the rack 24, inwardly so as to keep the pickup arm 16 substantially tangential to the groove 14 at the point of engagement. The signals developed at the output of the signal pickup 15 are coupled to a suitable signal processing circuit for playback via an image display apparatus. At the end of the playback cycle, the pickup arm 16 is lifted upwardly from the disc record 13, the drive mechanism 21 is disabled, and the turntable 12 drive mechanism is de-energized. It is noted that the open-ended slot 38 in the leaf spring 37 is sufficiently large to allow a free relative motion between the leaf spring and the wire 30. The clamp 39 is positioned on the wire 30 so that when the support housing 17 is at the end of its radially inward excursion the leaf spring 37 barely engages the clamp. The cover 11 is raised from the base 10. As the cover 11 is raised, the clamp 39 exerts influence upon the leaf spring 37 to move outwardly to the rest position. By the end of the upwardly movement of the cover 11 the clamp 39 escorts the support housing 17 to the rest position. It is noted that a dimension of the clamp 39 is greater than the dimensions of the slot 38 so as to prevent a free passage of the clamp through the slot. A stop 40 may be affixed to the cover 11 to ensure that the support housing 17 comes to a rest at the end of its outwardly movement, consistently at the same location in relation to the cover. This may be desirable to assure a proper engagement of the signal pickup 15 with the groove 14 when the pickup arm 16 is lowered for a subsequent playback cycle. The leaf spring 37 serves the following purposes. First, it enables the clamp 39 to smoothly transer the motion of the cord means 28 to the support housing 17. Second, it accommodates any misadjustment in the position of the clamp 39 with respect to the cord means 28. Now that the support housing 17 is returned to the rest position, the previous disc record may be removed and a new disc record may be placed on the turntable or the previous disc record may be turned over in order to expose the second side of the disc record and placed on the turntable. The cover 11 is closed. The spring 29 is relieved and the clamp 39 is reset to its original position waiting for an engagement with the leaf spring 37 at the end of the playback cycle. The player is turned on.

Figure 4:
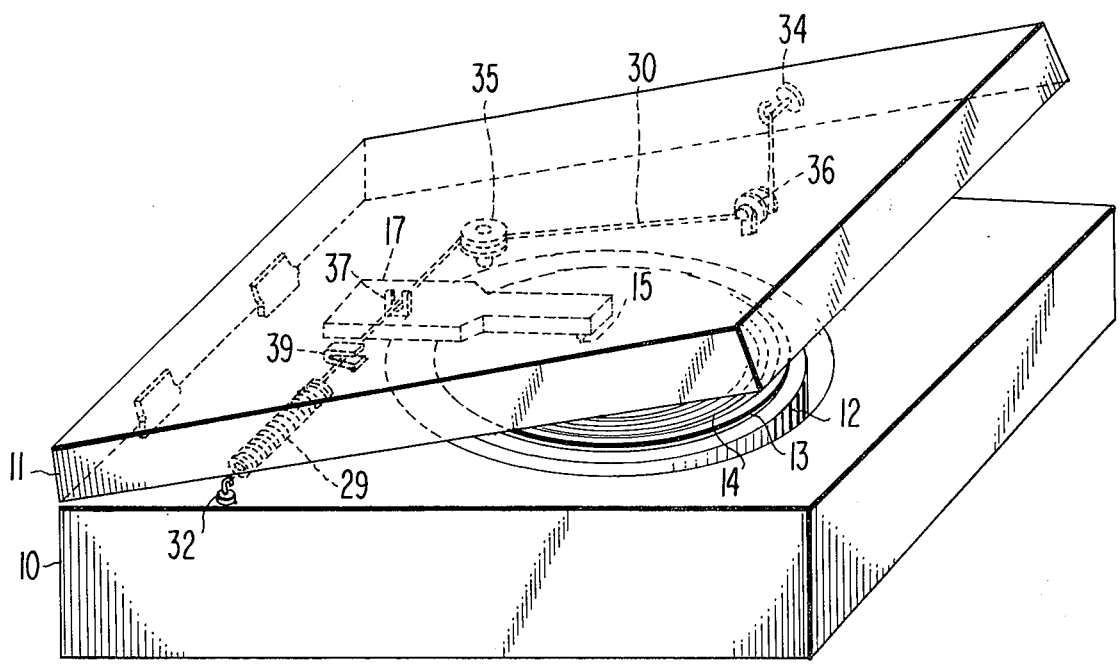
FIG. 4 is a simplified schematic diagram of another embodiment of the present invention.

It was pointed out earlier that in some players it may be desirable to mount the support housing 17 and the drive mechanism 21 on the base 10, instead of in the cover 11. FIG. 4 shows a simplified schematic diagram of an embodiment of the present invention, wherein the support housing 17 and the drive mechanism 21 (not shown) are mounted on the base 10. One end of the spring 29 is connected to the base 10 and the other end is connected to the wire 30. A clamp 39 is affixed to the wire 30. The wire 39 is affixed to the wire 30. The wire 39 is threaded through an opening in the leaf spring 37, pulled over the pulleys 35 and 36, and affixed to the cover 11. As the cover 11 is lifted away from the base 10, the spring 29 stretches to accommodate increase in the length of the path and the clamp 39 moves outwardly toward the leaf spring 37. The operation of the FIG. 4 arrangement being similar to the operation of the embodiment of FIGS. 1, 2, and 3 described above, the description of the FIG. 7 will not be extended further here.

Thus, an improved signal pickup return mechanism, which is simple and rugged in construction, easy to install, inexpensive to manufacture, and yet efficient and reliable in operation, is provided.

What is claimed is:

1. In a playback system including a base and a cover, a turntable mounted for rotation relative to said base, said turntable having a surface adapted for receiving a disc record, said disc record having a spiral groove with information recorded therein, a support housing carrying a signal pickup, and said signal pickup subject to positioning in relation to said spiral groove for scanning said information; a signal pickup return mechanism comprising:

bearing means for reciprocably supporting to-and-fro motion of said support housing over said turntable;

drive means for causing radially inward motion of said support housing for scanning of said information by said signal pickup;

extendible cord means having its ends respectively secured to said base and said cover, wherein said cord means extend as said cover is lifted away from said base; and engaging means affixed to said extendible cord means to the exclusion of said support housing; and wherein the location of said engaging means relative to said support housing is such that said engaging means is (1) subject to engagement with said support housing during radially outward motion of said engaging means as said cover is lifted away from said base, said engaging means being effective only in causing radially outward movement of said support housing, and (2) subject to disengagement from said support housing during radially inward motion of said support housing when said cover is closed, said engaging means permitting without hindrance radially inward movement of said support housing when said cover remains closed, while urging said support housing to return to a rest position as said cover is lifted away from said base.

2. A system as defined in claim 1 wherein said cord has a first portion which is extendible and a second portion which is relatively inelastic.

3. A system as defined in claim 2 wherein said first portion comprises a spring.

4. A system as defined in claim 3 further including a stop for consistently locating said support housing at a predetermined position at the termination of radially outward motion of said support housing.

5. A system as defined in claim 1 wherein said bearing means is secured to said cover.

6. A system as defined in claim 1 wherein said bearing means is secured to said base.

7. In a playback system including a base and a cover, a turntable mounted for rotation relative to said base, said turntable having a surface adapted for receiving a disc record, said disc record having a spiral groove with information recorded therein, a support housing carrying a signal pickup, and said signal pickup subject to positioning in relation to said spiral groove for scanning said information; a signal pickup return mechanism comprising:

bearing means for supporting reciprocal motion of said support housing toward and away from a rest position; said bearing means being oriented so that said reciprocal motion of said housing results in motion of said signal pickup along a path radially disposed with respect to the center of said turntable;

selectively actuated drive means for causing motion of said support housing on said bearing means only in a direction away from said rest position; said driving means providing, when actuated, radially inward travel of said signal pickup to effect said scanning of said information;

extendible cord means having its ends respectively secured to said base and said cover; wherein said cord means extend as said cover is lifted away from said base; and engaging means affixed to said extendible cord means to the exclusion of said support housing; said engaging means subject to motion between first and second locations along a path lying parallel to said radially disposed signal pickup path in response to movement of said cover with respect to said base; said engaging means occupying said first location when said cover is in a closed position and occupying said second location when said cover is in an open position;

the location of said path for said engaging means being disposed relative to said support housing in such manner that said engaging means: (1) is subject to engagement with said support housing during motion of said engaging means from said first location to said second location, when said cover is moved from said closed position to said open position in the instance of absence of said support housing from said rest position, to cause movement of said support housing toward said rest position; (2) is subject to disengagement from said support housing during motion of said engaging means for said second location to said first location, when said cover is moved from said open position to said closed position, so that closure of said cover may be effected without disturbance of the position of said support housing; and (3) remains disengaged from said support housing during radial inward travel of said support housing under closed cover conditions, until the terminal portion of such travel.

8. A system as defined in claim 7 wherein said bearing means is secured to said cover; said system including a stop for establishing said rest position for said support housing in a location aligning said signal pickup with a peripheral region of said turntable subject to covering by the initial convolution of said spiral groove when said disc record is received thereby.

* * * * *